United States Patent

Meyborg

[11] 4,115,320
[45] Sep. 19, 1978

[54] CATALYSTS FOR ISOCYANATE POLYADDITION REACTIONS

[75] Inventor: Holger Meyborg, Odenthal-Gloebusch, Germany

[73] Assignee: Bayer Aktiengesellschaft, Leverkusen, Germany

[21] Appl. No.: 757,720

[22] Filed: Jan. 7, 1977

[30] Foreign Application Priority Data

Jan. 14, 1976 [DE] Fed. Rep. of Germany ....... 2601082

[51] Int. Cl.$^2$ .................. B01J 31/12; C08G 18/00
[52] U.S. Cl. .................. 252/431 C; 252/431 N; 528/52; 521/124; 521/125; 521/126; 521/127; 521/128
[58] Field of Search .............. 252/431 N, 431 C

[56] References Cited

U.S. PATENT DOCUMENTS

| | | | |
|---|---|---|---|
| 3,565,875 | 2/1971 | Bozik et al. | 252/431 N |
| 3,635,906 | 1/1972 | Jayawat | 252/431 N X |
| 3,668,146 | 6/1972 | Ruhle | 252/431 N X |
| 3,769,244 | 10/1973 | Hashimoto et al. | 260/77.5 AC |
| 3,814,707 | 6/1974 | Moller et al. | 260/2.5 AC |
| 3,899,443 | 8/1975 | Reymore, Jr. et al. | 252/431 C |
| 4,006,124 | 2/1977 | Welte et al. | 260/2.5 AC X |

FOREIGN PATENT DOCUMENTS 1,950,262   4/1970   Fed. Rep. of Germany.

Primary Examiner—Delbert E. Gantz
Assistant Examiner—William G. Wright
Attorney, Agent, or Firm—Gene Harsh; Joseph C. Gil; R. Brent Olson

[57] ABSTRACT

This invention relates to new catalyst combinations having improved catalytic activity for isocyanate polyaddition reactions. The catalysts are combinations of known metal catalysts with aromatic compounds which contain at least one nitrogen atom as a hetero atom and have at least one primary amino group in the ortho- or para-position to the hetero atom. Preferred aromatic compounds include

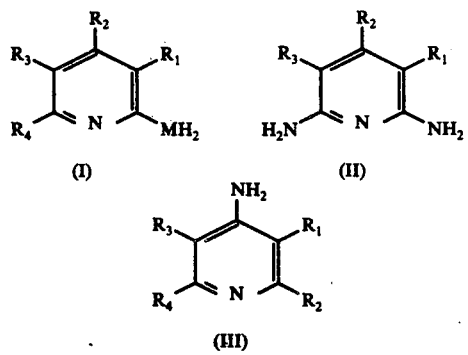

wherein
$R_1$, $R_2$, $R_3$ and $R_4$ which may be the same or different, each represent a hydrogen atom, an aliphatic hydrocarbon group having from 1 to 6 carbon atoms or an aromatic hydrocarbon group having from 6 to 12 carbon atoms or two of the groups $R_1$ to $R_4$ represent a condensed aromatic ring.

5 Claims, No Drawings

CATALYSTS FOR ISOCYANATE POLYADDITION REACTIONS

BACKGROUND OF THE INVENTION

It has long been known that both heavy metal compounds and amines are efficient catalysts for isocyanate polyaddition reactions (see K. C. Frisch, L. P. Rennao, "Catalysis in isocyanate reactions" in J. Macromol. Sci.-Revs. Macromol. Chem. C5 (1), 103-150 (1970)).

It is also known that metal compounds and amines may have a synergistic effect on each other for reactions of polyisocyanates with polyols (see J. H. Saunders and K. C. Frisch, Polyurethanes, Part I, Interscience Publishers, New York — London — Sydney, 1962, pages 231, 232).

The most catalytically active amines, which generally contain tertiary nitrogen atoms (such as 1,4-diazabicyclo-(2,2,2)-octane) are generally required to be used in amounts of from 0.04 to 0.5 parts by weight, based on the total quantity of polyol in the reaction. Considerably larger catalyst quantities are required if other amines are used as catalysts or if the amines are to catalyze reactions of aliphatic isocyanates.

However, even the use of small quantities of amine catalysts entails serious disadvantages. Since the catalysts used for industrial processes are generally tertiary amines which are not chemically built into the polyurethane, a troublesome odor of amine persists long after production of the polyurethane resin. This is particularly unpleasant in articles for daily use, such as cushions or the like, equipment for car interiors, shoes, furniture, and the like. Moreover, amines frequently cause yellowing of light colored leather or plastic surfaces.

Bicyclic amidines have been described as catalysts for polyurethanes in U.S. Pat. No. 3,814,707 and in British Patent No. 1,182,014. These publications also mention the addition of organometallic compounds.

Free amidines have been described as catalysts for reactions of aliphatic isocyanates in German Offenlegungschrift No. 1,950,262, but these compounds have the disadvantage of being readily decomposed by water (see Houben-Weyl-Muller, Methoden der organischen Chemie, published by G. Thieme, Stuttgart, Volume XI, page 940). This substantially excludes the use of foam systems in which water is used as a blowing agent. Even the traces of water invariably present in polyols are sufficient to reduce the catalytic activity of free amidines within a few days. A polyol mixture containing an amidine catalyst may therefore only be stored for a limited length of time.

In addition to water, numerous halogenated hydrocarbons, such as $CH_2Cl_2$, $CHCl_3$, $CCl_4$, $HClC=CClH$, $HClC=CCl_2$, $H_2ClC-CClH_2$, and the like severely restrict the possible uses of amidines because they react very rapidly to quaternize amidines. This renders them virtually useless as catalysts.

DESCRIPTION OF THE INVENTION

The present invention relates to the use of the primary amines defined below as co-catalysts for the isocyanate polyaddition reaction. When used in combination with the metal compounds defined below, they constitute excellent catalyst systems which are substantially free from the disadvantages mentioned above and have, in particular, the following advantages:

(1) Polyurethane foams produced with the aid of the new catalyst combinations have no detectable odor of amine since the amines put into the process react with polyisocyanates to form ureas.

(2) In contrast to amidines, the co-catalysts used according to the present invention are stable in storage in the presence of water and halogenated hydrocarbons.

(3) When used for the production of polyurethane foams in molds, the catalyst systems render the foam products more easily removable from the molds. In this respect, they differ advantageously from the combinations of 1,4-diazabicyclo-(2,2,2)-octane and organic tetravalent tin compounds which have previously been used as the preferred catalysts.

(4) The ureas produced from the co-catalysts of the present invention show no catalytic activity so that there is no risk of catalysis of thermal decomposition or hydrolytic degradation by the amine component.

The present invention, therefore, relates to co-catalyst combinations comprising:

(A) 1 mol of a metal compound corresponding to the following formula:

$$Me\ X_n\ Y_m$$

wherein

Me represents a metal having a valency of $(n+m)$, and preferably selected from the group consisting of Group Ib, IIb, VIIb, VIII and Group IVa metals of the Periodic Table, X represents an aliphatic hydrocarbon group having from 1 to 18 carbon atoms, an aromatic hydrocarbon group having from 6 to 10 carbon atoms or an araliphatic hydrocarbon group having from 7 to 15 carbon atoms, Y represents an enolate group having from 5 to 18 carbon atoms or an aliphatic carboxylate group having from 2 to 18 carbon atoms, optionally containing olefinic double bonds and/or alcoholic hydroxyl groups, $n$ represents an integer of from 0 to 2 and $m$ represents an integer of from 0 to 4 such that the sum of $(n+m)$ has a value of from 2 to 4, and (B) from 0.5 to 5 mol, preferably from 1 to 3 mol of an aromatic compound having at least one nitrogen atom as a hetero atom and at least one primary amino group in the ortho- or para-position to the hetero atom.

The heterocyclic aromatic compounds used as co-catalysts according to the present invention are low in $\pi$-electrons. The tertiary nitrogen in the position of a hetero atom weakens the reactivity of the primary amino group by the tautomeric equilibrium represented by the following formula:

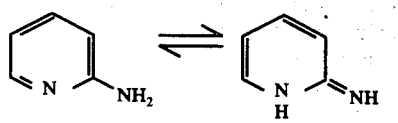

The following co-catalysts are preferred according to the present invention:

(1) Amines corresponding to the following general formula:

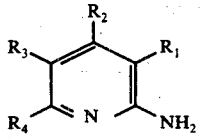

wherein
$R_1$, $R_2$, $R_3$ and $R_4$, which may be the same or different, each represent a hydrogen atom, an aliphatic hydrocarbon group having from 1 to 6 carbon atoms or an aromatic hydrocarbon group having from 6 to 12 carbon atoms. $R_3$ and $R_4$ or $R_1$ and $R_2$ or $R_2$ and $R_3$ may together represent a condensed aromatic ring, thus forming a bicyclic or tricyclic aromatic hydrocarbon. The following are examples of such amines:
2-aminopyridine, the 2-aminopicolines, 2-aminoquinoline, 1-aminoisoquinoline and 9-aminophenanthridine.

(2) Amines corresponding to the following general formula:

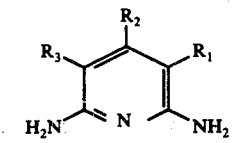

wherein
$R_1$, $R_2$ and $R_3$ are as defined above in connection with general formula (I). The following are examples of such amines: 2,6-diaminopyridine and the 2,6-diaminopicolines.

(3) Amines corresponding to the following general formula:

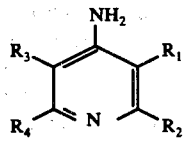

wherein
$R_1$, $R_2$, $R_3$ and $R_4$ are as defined above in connection with general formula (I). The following are examples of such amines: 4-aminopyridine, the 4-aminopicolines, 4-aminoquinoline and 9-aminoacridine.

Particularly preferred among the compounds corresponding to the above general formula (I), (II) and (III), are those wherein $R_1$, $R_2$, $R_3$ and $R_4$ all represent hydrogen, or only one of $R_1$ to $R_4$ represents methyl and the others hydrogen, or only two of $R_1$ to $R_4$ represent a condensed aromatic ring and the others hydrogen.

Compounds corresponding to general formula (II) are of particular interest for the purpose of the present invention, because they do not act as chain terminating agents in the reaction mixture and thus do not interfere with the polyaddition reaction. In fact, both amino groups react with polyisocyanates to bring about chain lengthening and form polyurea.

Aromatic amines which contain more than one nitrogen atom as hetero atom or contain other hetero atoms (oxygen or sulphur) may, of course, also be used as co-catalysts according to the present invention. Examples of such amines are the pyrimidine derivatives:

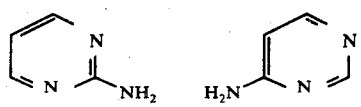

The fact that the compounds described above which contain at least one primary and one tertiary aromatic amino group have a surprising catalytic activity as co-catalyst becomes clear when one compares the activity of these compounds, and particularly of 2- and 4-aminopyridine, with that of aniline or of unsubstituted pyridine used in combination with metal catalysts. In both of the last two cases mentioned, the catalytic activity of the mixtures investigated is in no way found to be significantly greater than that of the metal compound used alone.

According to the present invention, the metal compounds used in combination with the amines described above are preferably compounds of trivalent iron, divalent nickel, divalent zinc, divalent manganese, divalent tin and tetravalent tin. The following are examples of suitable metal compounds: Fe(III)acetate, Fe(III) oleate, Fe(III) stearate, Fe(III) acetylacetonate, Zn acetate, Zn oleate, Zn acetylacetonate, Mn(II) acetate, Mn(II) acetyl acetonate, Mn(II) palmitate, Mn(II) versatate, Mn(II) naphthenate, Sn(II) acetate, Sn(II) octoate, Sn(II) isooctoate, Sn(II) ricinoleate, Sn(II) naphthenate, dibutyl-Sn(IV) laurate, dibutyl-Sn(IV) octoate, diethyl-Sn(IV) 2-methylhexoate, diphenyl-Sn(IV) caproate, Ni(II) acetate, Ni(II) octoate, Ni(II) oleate, Ni(I) ricinoleate, Ni(II) acetylacetonate, Ni(II) salicylate, $MoS_2$, $BiCl_3$ and Co (II) acetylacetonate. According to an earlier proposal by the present Applicants (DOS 2 434 185; corresponding to U.S. patent application Ser. Nos. 590 768 now U.S. Pat. No. 4,006,124 and 720 727) now abandoned complexes of 1 mol of an amidine and from 0.5 to 4 mols of an organic metal compound of the same type as used in the catalyst combinations according to the present invention are used as catalysts for isocyanate polyaddition reactions. Although the co-catalysts used according to the present invention may technically also be regarded as amidines since they contain structural units of the formula:

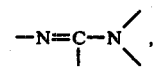

there is an essential difference between the present invention and the earlier proposal mentioned above. In the mixtures according to the present invention, the components do not form a complex which may be isolated. This may be proved by thin layer chromatography and NMR and IR spectroscopy. In all cases, 2-aminopyridine may be identified in addition to the tin compound in solutions of 2-aminopyridine dissolved in a 1:1 molar ratio in dibutyl tin dilaurate. Furthermore, the typical thermal effect of complex formation is not observed (see also Example 1).

It is therefore immaterial for the desired catalytic effect whether the metal compound and amine are added one after another to the reaction solution or simultaneously, for example in the form of a solution in a polyether.

A solution of 2-aminopyridine in dibutyl tin dilaurate is particularly preferred according to the present invention, but other dialkyl tin (IV) compounds may also be used to advantage.

The solutions obtained are generally homogeneously miscible with low molecular weight and high molecular weight polyhydroxyl compounds of the type used for the production of polyurethane resins, but the amine component may, if desired, be used in a finely dispersed form. When the new combinations are used according to the present invention, the solution of amine in the metal compound is normally added in a quantity of from 0.001 to 4%, by weight, and preferably from 0.01 to 0.8%, by weight, (based on the amount of active hydrogen containing component), to the active hydrogen component used for the production of polyurethane resins.

The new catalyst combinations may be used advantageously both for the production of solid elastomers and for the production of polyurethane foams. Rigid, semi-rigid or flexible products may be produced according to the present invention, depending on the reaction mixture and method of procedure. The densities of the products obtained may vary from about 15 to about 1000 kg/m$^3$.

Apart from their catalytic activity, the 2,6-diamino-compounds corresponding to general formula (III) are also of interest as amine cross-linking agents and may therefore advantageously be used in higher concentrations than described above to serve as chain lengthening agents.

The present invention, therefore, also relates to a process for the production of polyurethane resins by the reaction of polyisocyanates, higher molecular weight compounds containing at least two hydrogen atoms which are reactive with isocyanates and optionally also chain lengthening agents in the presence of catalyst combinations consisting of an amine and an organometallic compound, characterized in that the catalysts used are the mixtures according to the present invention.

The polyisocyanates used as starting components for the production of polyurethane resins with the aid of the new catalyst combinations according to the present invention may be any aliphatic, cycloaliphatic, araliphatic, aromatic or heterocyclic polyisocyanates, such as those described, for example, by W. Siefken in Justus Liebigs Annalen der Chemie, 562, pages 75 to 136. These include, for example, ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and 1,4-diisocyanate and mixtures of these isomers; 1-isocyanato-3,3,5-trimethyl-5-isocyanatomethylcyclohexane (DAS No. 1,202,785, U.S. Pat. No. 3,401,190); hexahydrotolylene-2,4- and -2,6-diisocyanate and mixtures of these isomers; hexahydrophenylene-1,3- and/or 1,4-diisocyanate; perhydrodiphenylmethane-2,4'- and/or 4,4'-diisocyanate; phenylene-1,3- and -1,4-diisocyanate; tolylene-2,4- and -2,6-diisocyanate and mixtures of these isomers; diphenylmethane-2,4'- and/or 4,4'-diisocyanate; naphthylene-1,5-diisocyanate; triphenylmethane-4,4', 4"-triisocyanate; polyphenyl-polymethylene polyisocyanate which may be obtained by aniline/formaldehyde condensation followed by phosgenation and which have been described, for example, in British Pat. Nos. 874,430 and 848,671; m- and p-isocyanatophenylsulphonylisocyanates according to U.S. Pat. No. 3,454,606; perchlorinated aryl polyisocyanates as described, e.g. in U.S. Pat. No. 3,277,138; polyisocyanates containing carbodiimide groups as described in U.S. Pat. No. 3,152,162; the diisocyanates described in U.S. Pat. No. 3,492,330; polyisocyanates containing allophanate groups as described, e.g.: in British Pat. No. 994,890, Belgian Pat. No. 761,626 and published Dutch Pat. Application No. 7,102,524; polyisocyanates containing isocyanurate groups as described, e.g. in U.S. Pat. No. 3,001,973, in German Pat. No. 1,022,789; 1,222,067 and 1,027,394 and in German Offenlegungsschriften Nos. 1,929,034 and 2,004,048; polyisocyanates containing urethane groups as described, e.g. in Belgian Pat. No. 752,261 or in U.S. Pat. No. 3,394,164; polyisocyanates containing acylated urea groups according to German Pat. No. 1,230,778; polyisocyanates containing biuret groups as described, e.g. in German Pat. No. 1,101,394 (U.S. Pat. Nos. 3,124,605 and 3,201,372) and in British Pat. No. 889,050; polyisocyanates prepared by telomerization reactions as described, e.g. in U.S. Pat. No. 3,654,106, polyisocyanates containing ester groups as mentioned, for example, in British Pat. Nos. 965,474 and 1,072,956, in U.S. Pat. No. 3,567,763 and in German Pat. No. 1,231,688; reaction products of the above-mentioned isocyanates with acetals according to German Pat. No. 1,072,385; and polyisocyanates containing polymeric fatty acid groups according to U.S. Pat. No. 3,455,883.

The distillation residues obtained from the commercial production of isocyanates which still contain isocyanate groups may also be used, optionally dissolved in one or more of the above-mentioned polyisocyanates. Mixtures of the above-mentioned polyisocyanates may also be used.

The commercially readily available polyisocyanates are generally preferred. These include, for example tolylene-2,4- and -2,6-diisocyanate and mixtures of these isomers ("TDI"), polyphenylpolymethylene polyisocyanates, which may be obtained by aniline/formaldehyde condensation followed by phosgenation ("crude MDI"); and polyisocyanates containing carbodiimide groups, urethane groups, allophanate groups, isocyanurate groups, urea groups or biuret groups ("modified polyisocyanates").

The starting components used for the production of polyurethane resins with the aid of the new catalyst combinations according to the present invention also include compounds which contain at least two hydrogen atoms capable of reacting with isocyanates and which generally have a molecular weight of from about 400 to about 10,000. These may be compounds containing amino groups, thiol groups or carboxyl groups, but are preferably polyhydroxyl compounds, in particular compounds having from 2 to 8 hydroxyl groups and especially those having a molecular weight of from 800 to 10,000 and preferably from 1000 to 6000. These include, for example, polyesters, polyethers, polythioethers, polyacetals, polycarbonates and polyester amides containing at least 2, generally from 2 to 8 and preferably from 2 to 4 hydroxyl groups, such as those known for the production of both homogeneous and cellular polyurethanes.

The hydroxyl group-containing polyesters used may be, for example, reaction products of polyhydric, preferably dihydric alcohols, optionally with the addition of trihydric alcohols, and polybasic, preferably dibasic carboxylic acids. Instead of using the free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. with halogen atoms, and/or be unsaturated. The following are mentioned as examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally mixed with monomeric fatty acids, dimethylterephthalate and terephthalic acid-bis-glycol esters. Suitable polyhydric alcohols include, e.g. ethylene glycol; propylene glycol-(1,2) and -(1,3); butylene glycol-(1,4) and -(2,3); hexanediol-(1,6); octanediol-(1,8); neopentyl glycol; cyclohexane dimethanol (1,4-bis-hydroxymethylcyclohexane); 2-methyl-1,3-propanediol; glycerol; trimethylolpropane; hexanetriol(1,2,6); butanetriol-(1,2,4); trimethylolethane; pentaerythritol; quinitol; mannitol and sorbitol; methylglycoside; diethylene glycol; triethylene glycol; tetraethylene glycol; polyethylene glycols; dipropylene glycol; polypropylene glycols; dibutylene glycol and polybutylene glycols. The polyesters may also contain carboxyl end groups. Polyesters of lactones, such as ε-caprolactone, and hydroxycarboxylic acids, such as ω-hydroxycaproic acid, may also be used.

The polyethers used according to the present invention which contain at least 2, generally from 2 to 8 and preferably 2 or 3 hydroxyl groups are known. They may be prepared, for example, by the polymerization of epoxides, such as ethylene oxide, propylene oxide, butylene oxide, tetrahydrofuran, styrene oxide or epichlorohydrin, either each on its own, (e.g. in the presence of BF$_3$), or by chemical addition of these epoxides, optionally as mixtures or successively, to starting components having reactive hydrogen atoms, such as water, alcohols or amines, e.g. ethylene glycol, propylene glycol-(1,3) or -(1,2), trimethylol propane, 4,4'-dihydroxydiphenylpropane, aniline, ammonia, ethanolamine or ethylenediamine. Sucrose polyethers which have been described, for example, in German Auslegeschriften Nos. 1,176,358 and 1,064,938 may also be used according to the present invention. It is frequently preferred to use polyethers which contain predominantly primary OH groups (up to 90%, by weight, based on all the OH groups present in the polyether). Polyethers which have been modified with vinyl polymers, for example the compounds obtained by the polymerization of styrene and acrylonitrile in the presence of polyethers (U.S. Pat. Nos. 3,383,351; 3,304,273; 3,523,093 and 3,110,695 and German Pat. No. 1,152,536) are also suitable. Polybutadienes containing OH groups may also be used.

Among the polythioethers which should be particularly mentioned are the condensation products obtained from thiodiglycol on its own and/or with other glycols, dicarboxylic acids, formaldehyde, aminocarboxylic acids or amino alcohols. The products obtained are polythio mixed ethers, polythio ether esters or polythioether ester amides, depending on the co-components.

Suitable polyacetals include, e.g. the compounds which may be obtained from glycols, such as diethylene glycol, triethylene glycol, 4,4'-dioxethoxy-diphenyldimethylmethane or hexanediol, and formaldehyde. Polyacetals suitable for the purpose of the present invention may also be prepared by polymerizing cyclic acetals.

Suitable polycarbonates containing hydroxyl groups are known and may be prepared, for example, by the reaction of diols, such as propanediol-(1,3), butanediol-(1,4) and/or hexanediol-(1,6), diethylene glycol, triethylene glycol or tetraethyleneglycol, with diarylcarbonates, e.g. diphenyl carbonate, or phosgene.

Suitable polyester amides and polyamides include, e.g. the predominantly linear condensates obtainable from polybasic saturated and unsaturated carboxylic acids or their anhydrides and polyvalent saturated and unsaturated amino alcohols, diamines, polyamines or mixtures thereof.

Polyhydroxyl compounds already containing urethane or urea groups as well as modified or unmodified natural polyols, such as castor oil, carbohydrates or starch may also be used. Additionally, products of alkylene oxides and phenol/formaldehyde resins or of alkylene oxides and urea/formaldehyde resins are also suitable according to the present invention.

Representatives of these compounds which may be used according to the present invention have been described, e.g. in High Polymers, Vol. XVI, "Polyurethanes, Chemistry and Technology", by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Höchtlen, Carl-Hanser-Verlag, Munich, 1966, e.g. on pages 45 to 71.

Mixtures of the above-mentioned compounds containing at least two hydrogen atoms capable of reacting with isocyanates and having a molecular weight of from about 400 to about 10,000 may, of course, also be used, e.g. mixtures of polyethers and polyesters.

The starting components used according to the present invention optionally also include compounds having a molecular weight of from 32 to about 400 which contain at least two hydrogen atoms capable of reacting with isocyanates. These are also compounds containing hydroxyl groups and/or amino groups and/or thiol groups and/or carboxyl groups, preferably compounds containing hydroxyl groups and/or amino groups. They serve as chain lengthening agents or cross-linking agents. They generally contain from 2 to 8 hydrogen atoms capable of reacting with isocyanates, preferably 2 or 3 such hydrogen atoms. The following are mentioned as examples of such compounds: ethylene glycol; propylene glycol-(1,2) and -(1,3); butylene glycol-(1,4) and -(2,3); pentanediol-(1,5); hexanediol-(1,6); octanediol-(1,8); neopentylglycol; 1,4-bis-hydroxymethylcyclohexane; 2-methyl-1,3-propanediol; glycerol; trimethylolpropane; hexanetriol(1,2,6); trimethylolethane; pentaerythritol; quinitol; mannitol and sorbitol; diethylene glycol; triethylene glycol; tetraethylene glycol; polyethylene glycols having a molecular weight of up to 400; dipropylene glycol, polypropylene glycols having a molecular weight of up to 400; dibutylene glycol; polybutylene glycols having a molecular weight of up to 400; 4,4'-dihydroxy-diphenylpropane; dihydroxymethylhydroquinone; ethanolamine; diethanolamine; triethanolamine; 3-aminopropanol; ethylenediamine; 1,3-diaminopropane; 1-mercapto-3-aminopropane; 4-hydroxyphthalic acid or 4-aminophthalic acid; succinic acid; adipic acid; hydrazine; N,N'-dimethylhydrazine and 4,4'-diaminodiphenylmethane.

Here again, mixtures of various compounds having a molecular weight of from 32 to 400 and containing at least two hydrogen atoms capable of reacting with isocyanate may be used.

Production of polyurethane resins with the aid of the new catalyst combinations according to the present invention is frequently carried out with the use of water and/or readily volatile organic substances as blowing agents. Suitable organic blowing agents include, e.g. acetone; ethyl acetate; halogenated alkanes, such as methylene chloride, chloroform, ethylidene chloride, vinylidene chloride, monofluorotrichloromethane, chlorodifluoromethane or dichlorodifluoromethane; butane; hexane; heptane or diethylether. The effect of a blowing agent may also be obtained by adding compounds which decompose at temperatures above room temperature to liberate gases, such as nitrogen, e.g. azo compounds, such as azoisobutyric acid nitrile. Other examples of blowing agents and details about the use of blowing agents may be found in Kunststoff-Handbuch, Volume VII, published by Vieweg and Höchtlen, Carl-Hanser-Verlag, Munich 1966, e.g. on pages 108 and 109, 453 to 455 and 507 to 510.

Other catalysts may, of course, be used in addition to the catalyst combinations according to the present invention, particularly if particular effects may thereby be obtained.

These additional catalysts include known catalysts, such as tertiary amines, e.g. triethylamine; tributylamine; N-methylmorpholine; N-ethylmorpholine; N-cocomorpholine; N,N,N',N'-tetramethyl-ethylenediamine; 1,4-diaza-bicyclo(2,2,2)-octane; N-methyl-N'-dimethylaminoethyl-piperazine; N,N-dimethylbenzylamine; bis-(N,N-diethylaminoethyl)adipate; N,N-diethylbenzylamine; pentamethyldiethylenetriamine; N,N-dimethylcyclohexylamine; N,N,N',N'-tetramethyl-1,3-butanediamine; N,N-dimethyl-β-phenylethylamine; 1,2-dimethylimidazole; and 2-methylimidazole. The known Mannich bases obtained from secondary amines, such as dimethylamine, and aldehydes, preferably formaldehyde, or ketones, such as acetone, methyl ethyl ketone or cyclohexanone, and phenols, such as phenol, nonylphenol or bisphenol, may also be used as catalysts.

Tertiary amines containing isocyanate-reactive hydrogen atoms used as catalysts include, e.g. triethanolamine; triisopropanolamine; N-methyl-diethanolamine; N-ethyldiethanolamine; N,N-dimethyl-ethanolamine and the reaction products thereof with alkylene oxides, such as propylene oxide and/or ethylene oxide.

Silaamines having carbon-silicon bonds as described, e.g. U.S. Pat. No. 3,620,984 may also be used as additional catalysts, for example 2,2,4-trimethyl-2-silamorpholine and 1,3-diethylaminomethyl-tetramethyldisiloxane.

The additional catalysts used may also be basic nitrogen compounds, such as tetralkylammonium hydroxides; alkali metal hydroxides, such as sodium hydroxide; alkali metal phenolates, such as sodium phenolate; or alkali metal alcoholates, such as sodium methylate. Hexahydrotriazines may also be used as catalysts.

One may, of course, use mixtures of various catalyst combinations according to the present invention or add other organometallic components if they have the additional effect of catalyzing other known reactions, such as dimerization, trimerization or carbodiimide formation, of the isocyanates, or for catalyzing secondary reactions, such as allophantization or biuret formation.

The additional catalysts are added in quantities of from 0 to 90% of the total quantity of catalysts, preferably in quantities of from 0 to 50%.

Production of the polyurethane resins with the aid of the new catalyst combinations according to the present invention may also be carried out with the addition of surface active agents (emulsifiers and/or foam stabilizers).

Suitable emulsifiers include, e.g. the sodium salts of ricinoleic sulphonates or salts of fatty acids and amines, such as oleic acid diethylamine or stearic acid diethanolamine. Alkali metal or ammonium salts of sulphonic acids, such as dodecylbenzene sulphonic acid or dinaphthylmethane disulphonic acid, or of fatty acids, such as ricinoleic acid, or of polymeric fatty acids may also be used as surface active additives.

The foam stabilizers used are mainly polyether siloxanes, especially those which are water-soluble. These compounds generally have a polydimethylsiloxane group attached to a copolymer of ethylene oxide and propylene oxide. Foam stabilizers of this type have been described, for example, in U.S. Pat. Nos. 2,834,748; 2,917,480 and 3,629,308.

According to the present invention reaction retarders may also be added e.g. compounds which are acid in reaction, such as hydrochloric acid or organic acid halides. Known cell regulators, such as paraffins or fatty alcohols or dimethylpolysiloxanes; pigments; dyes; known flame retarding agents, such as tris-chloroethylphosphate, tricresylphosphate or ammonium phosphate or polyphosphate; stabilizers against ageing and weathering; plasticizers; fungistatic and bacteriostatic substances; and fillers, such as barium sulphate, kieselguhr; carbon black or whiting may also be used.

Other examples of surface active additives, foam stabilizers, cell regulators, reaction retarders, stabilizers, flame retarding substances, plasticizers, dyes, fillers and fungistatic and bacteriostatic substances which may also be used according to the present invention and details concerning the use and action of these additives may be found in Kunststoff-Handbuch, Volume VII, published by Vieweg and Höchtlen, Carl-Hanser-Verlag, Munich 1966, e.g. on pages 103 to 113.

According to the present invention, the components may be reacted together by the known one-shot process, prepolymer process or semi-prepolymer process, in many cases using mechanical devices, such as those described in U.S. Pat. No. 2,764,565. Details about processing apparatus which may also be used according to the present invention may be found in Kunststoff Handbuch, Volume VII, published by Vieweg and Höchtlen, Carl-Hanser-Verlag, Munich 1966, e.g. on pages 121 to 205.

For producing foams according to the present invention, the foaming reaction is often carried out inside molds. The reaction mixture is introduced into a mold made of a metal, such as aluminum, or of a synthetic material, such as an epoxide resin. The reaction mixture foams inside the mold to form the shaped product. This process of foaming in molds may be carried out to produce a product having a cellular structure on its surface or it may be carried out to produce a product having a noncellular skin and cellular center. According to the present invention, the desired result may be obtained by either introducing just sufficient foamable reaction mixture into the molds to fill the mold with foam after the reaction or introducing a larger quantity of foamable reaction mixture, in which case the process is said to be carried out under conditions of overcharging, a procedure which has already been disclosed, for example, in U.S. Pat. Nos. 1,178,490 and 3,182,104.

When foaming is carried out in molds, "known so-called" external mold release agents, such as silicone oils, are frequently used, but so-called "internal mold release agents" may also be used, optionally in combination with external mold release agents, for example those disclosed in German Offenlegungsschriften Nos. 2,121,670 and 2,307,589.

Cold setting foams may also be produced according to the present invention (see British Pat. No. 1,162,517, German Offenlegungsschrift No. 2,153,086).

On the other hand, foams may, of course, be produced by the process of block foaming or by the known laminator process.

The following Examples serve to illustrate the invention. The figures quoted represent parts by weight or percentages by weight unless otherwise indicated.

EXAMPLES

EXAMPLE 1

9.4 g (0.1 mol) of 2-aminopyridine are dissolved in 63 g (0.1 mol) of dibutyl tin dilaurate with heating. The solution is examined by thin layer chromatography and compared with a 1:1 complex of dibutyl tin dilaurate and 2,3-dimethyl-tetrahydropyrimidine (silica gel, diluent ether, colored with concentrated $H_2SO_4$). Dibutyl tin dilaurate/2-aminopyridine shows two distinctly separate patches in the thin layer chromatogram, which, when compared with the pure compounds, may be identified as dibutyl tin dilaurate and 2-aminopyridine. The dibutyl tin dilaurate /2,3-dimethyltetrahydropyrimidine complex, on the other hand, shows no sign of the presence of free amidine.

The 60 MHz-NMR spectrum (in $(CH_3)_2CO$) confirms the chromatographic findings. Apart from dibutyl tin dilaurate, 2-aminopyridine is identified as the only other component. There is no sign of complex formation.

In addition to the NMR findings, the IR spectrum of the solution of 2-aminopyridine in dibutyl tin dilaurate also confirms that no complex formation occurs.

EXAMPLE 2

Semi-rigid polyether foam produced by unrestricted foaming and having a unit weight of about 400 mg/cm³.

The following abbreviations are used:

$T_1$ = onset of foaming reaction, $T_2$ = end of foaming reaction, $T_3$ = tack-free time, $T_4$ = complete curing time (after this time it is no longer possible to tear out parts of the foam by hand).

Reaction mixture: 70 g of a bifunctional polyether started on propylene glycol and composed of 90% of propylene oxide and 10% of ethylene oxide (OH number 27.5), 20 g of a trifunctional polyether (OH number 35.4), started on trimethylolpropane and composed of 90% propylene oxide and 10% ethylene oxide, 8 g of butane-1,4-diol, 12 g of trifluorochloromethane and 0.06 g of catalyst (2-aminopyridine/dibutyl tin dilaurate in a molar ratio of 1:1).

The components are carefully mixed for 30 seconds with the aid of a high speed stirrer at room temperature. 76.7 g of 4,4'-diisocyanatodiphenylmethane are then added and stirring is continued for a further 15 seconds.

$T_1 = 30 \pm 3$ seconds $T_2 = 50 \pm 3$ seconds $T_3 = 54 \pm 3$ seconds $T_4 = 60 \pm 5$ seconds

EXAMPLE 3 (Comparison Experiment)

For comparison, the analogous foaming reaction mixture is catalyzed with triethylenediamine and dibutyl tin dilaurate, again using 0.06 g of catalyst mixture (molar ratio 1:1).

$T_1 = 55 \pm 5$ seconds $T_2 = T_3 = 100 \pm 10$ seconds $T_4 = 140 \pm 10$ seconds

EXAMPLE 4

When the molar ratio of dibutyl tin dilaurate to 2-aminopyridine (total quantity of catalyst 0.06 g) is altered, the results obtained also change as follows:

|  | Molar ratio 1 : 2 | Molar ratio 1 : 5 |
|---|---|---|
| $T_1$ | 19 ± 3 seconds | 33 ± 3 seconds |
| $T_2$ | 30 ± 3 seconds | 51 ± 3 seconds |
| $T_3$ | 33 ± 3 seconds | 56 ± 3 seconds |
| $T_4$ | 48 ± 5 seconds | 85 ± 5 seconds |

The main effect of increasing the amine concentration in proportion to the quantity of dibutyl tin dilaurate is a marked increase in the complete curing time $T_4$.

EXAMPLE 5

The analogous foam is again catalyzed using 2-aminopyridine, 2-aminotoluene and pyridine, in each case in combination with dibutyl tin dilaurate (Z) in a molar ratio of 2:1 (0.06 g quantity of catalyst):

|  | 2-Aminopyridine/Z | 2-Aminotoluene/Z | Pyridine/Z |
|---|---|---|---|
| $T_1$ | 19 ± 3 | 27 ± 3 | 27 ± 3 |
| $T_2$ | 30 ± 3 | 45 ± 3 | 40 ± 3 |
| $T_3$ | 33 ± 3 | 59 ± 3 | 42 ± 3 |
| $T_4$ | 48 ± 5 | 96 ± 5 | 83 ± 5 |

EXAMPLE 6

The influence of the position of the amino group in the aromatic compound is investigated by using 2-aminoyridine, 3-aminopyridine and 4-aminopyridine in combination with dibutyl tin dilaurate (Z) in a molar ratio of 2:1 (0.06 g quantity of catalyst):

|  | 2-Aminopyridine/Z | 3-Aminopyridine/Z | 4-Aminopyridine/Z |
|---|---|---|---|
| $T_1$ | 19 ± 3 | 27 ± 3 | 23 ± 3 |
| $T_2$ | 30 ± 3 | 42 ± 3 | 35 ± 3 |
| $T_3$ | 33 ± 3 | 43 ± 3 | 40 ± 3 |

-continued

| | 2-Aminopyridine/Z | 3-Aminopyridine/Z | 4-Amino-pyridine/Z |
|---|---|---|---|
| $T_4$ | 48 ± 5 | 67 ± 5 | 43 ± 5 |

EXAMPLE 7

29.04 g of a catalyst mixture of 2-aminopyridine/-dibutyl tin dilaurate (molar ratio 1:1) in 37 ml of toluene are reacted with 4.76 g of phenyl isocyanate at room temperature. Petroleum ether is added to the resulting suspension after 1½ hours and the colorless precipitate is suction filtered. 7 g of N-(2-pyidyl)-N'-phenyl urea, m.p. 186°–188° C. are isolated.

This Example demonstrates that the co-components according to the present invention undergo complete reaction to the urea in the presence of polyisocyanates.

EXAMPLE 8

50 g of a polyether of 90% of propylene oxide and 10% of ethylene oxide (OH number 35.4) which has been started on trimethylolpropane are carefully mixed with 1.5 g of water, 0.5 g of a commercial silicon stabilizer (OS 20 of Bayer AG, Leverkusen, Germany) and 0.5 g of 2-aminopyridine/dibutyl tin dilaurate (molar ratio 2:1), using a high speed stirrer. 18 g of tolylene diisocyanate (80% 2,4-isomer, 20% 2,6-isomer), are added and the mixture is again stirred for 15 seconds and poured out into a paper cup. Foaming begins after 15 seconds and is completed after about 120 seconds. Brief curing at 80° C. completes the setting reaction. A foam with closed cells is initially obtaied, but it is easily opened up and is then elastic. Unit weight about 35 kg/m³.

EXAMPLE 9

A mixture of 60 parts, by weight, of polypropylene oxide having an OH number of 830 (starter trimethylolpropane), 40 parts, by weight, of a polyether of 90% propylene oxide and 10% ethylene oxide (starter trimethylolpropane/propylene glycol 3:1) having an OH number of 42, 1 part, by weight, of a polysiloxane-polyalkylene oxide block polymer (foam stabilizer OS 20 of Bayer AG, Leverkusen, Germany), 0.25 parts, by weight, of catalyst (2-amino-pyridine/dibutyl tin dilaurate in a molar ratio of 1:1) and 10 parts, by weight, of monofluorotrichloromethane was intimately mixed with 137 parts, by weight, of a polyisocyanate which has been prepared by phosgenating a commercial condensation product of aniline and formaldehyde (31% NCO; $\eta_{25}$ = 320 m Pa s), and the resulting mixture was introduced into a metal mold which had been heated to 60° C.

The mixture foams up after 34 seconds and sets after a further 17 seconds.

If the mold is overcharged with foamable reaction mixture, the molded polyurethane product obtained has a dense skin and cellular core having a density mainly in the region of from 0.2 to 0.8 g/cm³.

What is claimed is:
1. Catalyst combinations comprising:
   (A) 1 mol of a metal compound corresponding to the following formula:

$$Me\ X_n Y_m,$$

wherein
   Me represents a metal having a valency of $(n+m)$,
   X represents an aliphatic hydrocarbon group having from 1 to 18 carbon atoms, an aromatic hydrocarbon group having from 6 to 10 carbon atoms, or an araliphatic hydrocarbon group having from 7 to 15 carbon atoms,
   Y represents an enolate group having from 5 to 18 carbon atoms or an aliphatic carboxylate group having from 2 to 18 carbon atoms,
   $n$ represents an integer of from 0 to 2 and
   $m$ represents an integer of from 0 to 4 such that the sum of $(n + m)$ is from 2 to 4, and
   (B) from about 0.5 to about 5 mols of a primary amine corresponding to the following general formula:

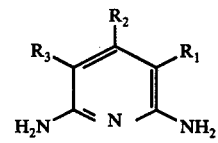

wherein
   $R_1$, $R_2$, and $R_3$, which may be the same or different, each represent a hydrogen atom, an aliphatic hydrocarbon group having from 1 to 6 carbon atoms, an aromatic group having from 6 to 12 carbon atoms, or two of the groups $R_1$ to $R_3$ represent a condensed aromatic ring.
2. The catalyst of claim 1, wherein $R_1$, $R_2$ and $R_3$ all represent hydrogen, or only one of $R_1$ to $R_3$ represents methyl and the other represent hydrogen or only two of $R_1$ to $R_3$ represent a condensed aromatic ring and the other represents hydrogen.
3. The catalyst of claim 1, wherein the metal is from I$b$, II$b$, VIII groups or IV$a$ group of metals of the Periodic Table.
4. The catalyst of claim 1, wherein from 1 to 3 mols of compound (B) is used per mol of compound (A).
5. The catalyst of claim 3, wherein the metal is selected from the group consisting of trivalent iron, divalent nickel, divalent zinc, divalent manganese, divalent tin and tetra valent tin.

* * * * *